(12) United States Patent
Bitto et al.

(10) Patent No.: US 8,555,730 B2
(45) Date of Patent: Oct. 15, 2013

(54) MEASURING TRANSDUCER HAVING A SECUREMENT ELEMENT AND AN ADD-ON PART ON THE FLOW TUBE ACTING AS A CANCELLING MASS

(75) Inventors: Ennio Bitto, Aesch (CH); Wolfgang Drahm, Erding (DE); Gerhard Eckert, Grenzach-Wyhlen (DE); Dieter Mundschin, Liestal (CH)

(73) Assignee: Endress + Hauser Flowtec AG, Reinach (CH)

( * ) Notice: Subject to any disclaimer, the term of this patent is extended or adjusted under 35 U.S.C. 154(b) by 389 days.

(21) Appl. No.: 12/926,039

(22) Filed: Oct. 22, 2010

(65) Prior Publication Data
US 2011/0094312 A1    Apr. 28, 2011

(30) Foreign Application Priority Data
Oct. 27, 2009    (DE) .......................... 10 2009 046 043

(51) Int. Cl.
*G01F 1/84*    (2006.01)
(52) U.S. Cl.
USPC .................................................... 73/861.355
(58) Field of Classification Search
None
See application file for complete search history.

(56) References Cited

U.S. PATENT DOCUMENTS

| | | | | |
|---|---|---|---|---|
| 2,897,672 A | | 10/1955 | Glasbrenner | |
| 4,776,220 A | * | 10/1988 | Lew | 73/861.355 |
| 4,876,898 A | * | 10/1989 | Cage et al. | 73/861.355 |
| 5,425,277 A | * | 6/1995 | Lew | 73/861.355 |
| 5,663,509 A | * | 9/1997 | Lew et al. | 73/861.357 |
| 5,996,225 A | * | 12/1999 | Ollila et al. | 29/888.09 |
| 6,332,367 B1 | * | 12/2001 | Ollila et al. | 73/861.357 |
| 6,564,650 B2 | * | 5/2003 | Ollila et al. | 73/861.355 |
| 2007/0163363 A1 | * | 7/2007 | Kitami et al. | 73/861.357 |
| 2008/0047360 A1 | * | 2/2008 | Kitami et al. | 73/861.355 |
| 2008/0141788 A1 | * | 6/2008 | Nakao | 73/861.355 |

FOREIGN PATENT DOCUMENTS

| | | |
|---|---|---|
| DE | 41 38 840 C2 | 5/1993 |
| DE | 690 19 453 T2 | 1/1996 |
| DE | 103 22 763 A1 | 12/2004 |
| EP | 1 223 412 A1 | 7/2002 |
| WO | WO 95/07445 | 3/1995 |

* cited by examiner

*Primary Examiner* — Harshad R Patel
(74) *Attorney, Agent, or Firm* — Bacon & Thomas, PLLC

(57) ABSTRACT

A measuring transducer of vibration type, especially a Coriolis mass flow meter, having a housing and a mass flow tube, wherein the mass flow tube is formed into a helix having a first loop and a second loop; wherein the mass flow tube has a securement element which affixes a peripheral point of the first loop relative to a neighboring peripheral point of the second loop; and wherein the mass flow tube has an oscillation exciter on a side lying opposite the securement element along the mass flow tube. The mass flow tube has provided between the oscillation exciter and the securement element at least one add-on part acting as a canceling mass.

10 Claims, 1 Drawing Sheet

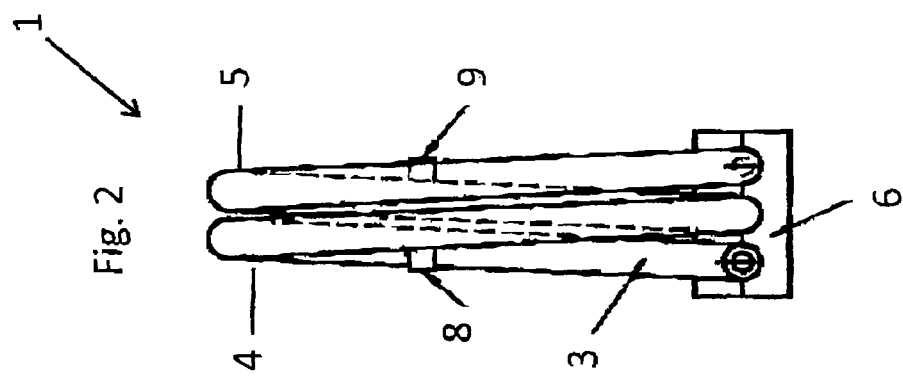
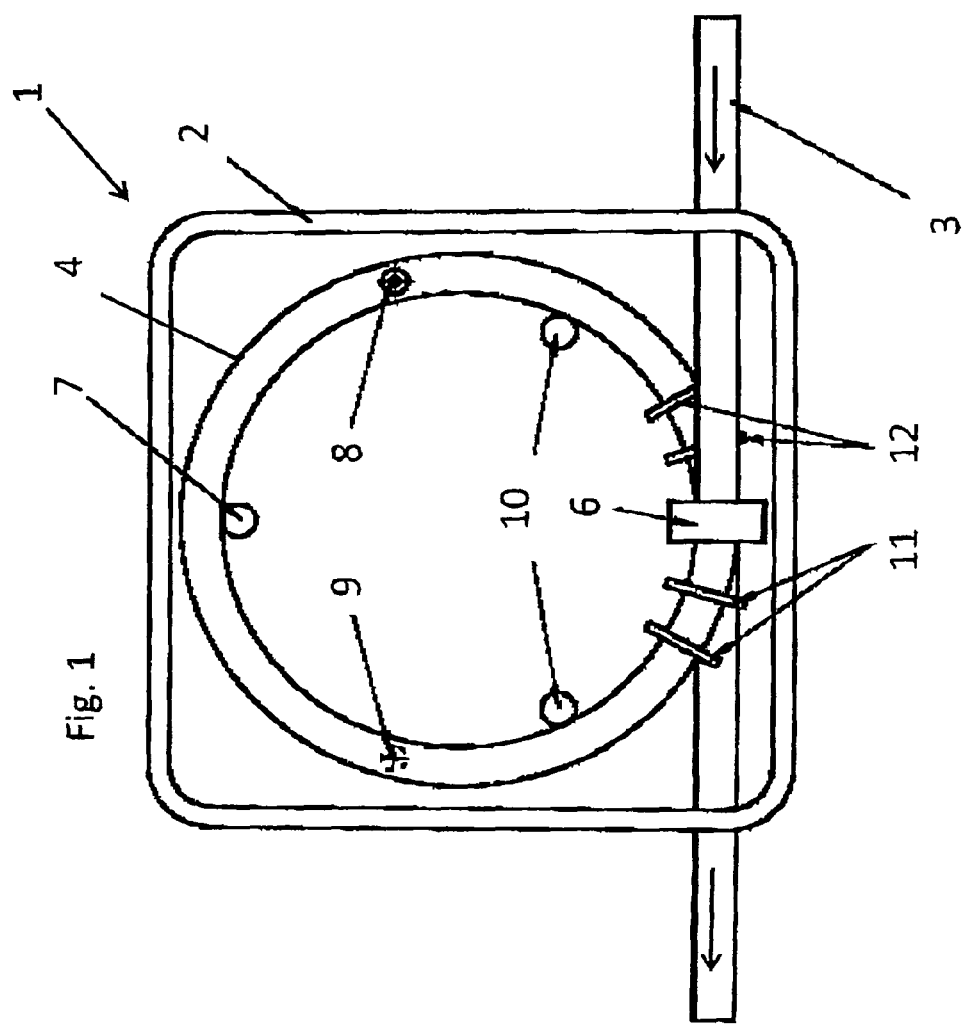

MEASURING TRANSDUCER HAVING A SECUREMENT ELEMENT AND AN ADD-ON PART ON THE FLOW TUBE ACTING AS A CANCELLING MASS

TECHNICAL FIELD

The invention relates to a measuring transducer of vibration type, especially a Coriolis, mass flow meter, wherein the measuring transducer has a housing and a mass flow tube; wherein the mass flow tube is formed into a helix having a first loop and a second loop, wherein the mass flow tube has a securement element, which affixes a peripheral point of the first loop relative to a neighboring peripheral point of the second loop, and wherein the mass flow tube has an oscillation exciter on a side lying opposite the securement element along the mass flow tube.

BACKGROUND DISCUSSION

A measuring transducer of vibration type, especially a Coriolis, mass flow meter, is preferably used to ascertain a mass flow independently of the properties of the flowing medium, such as density, viscosity and/or flow profile. A further advantage of Coriolis, mass flow meters lies in the fact that the mass flow of a medium flowing through the measuring transducer can be measured without influencing the actual mass flow by a sensor immersed in the mass flow.

From DE 690 19 453 T2, a Coriolis mass flow meter is known, which has a mass flow tube coiled to a helix, wherein the helix includes a first loop and a second loop. An oscillation exciter, which is embodied as an electromagnetic exciter, acts between a peak of the first loop and a peak of the second loop. On a side of the helical mass flow tube lying opposite the oscillation exciter is arranged a securement element, which connects a peripheral point of the first loop with a neighboring peripheral point of the second loop. Furthermore, arranged between the first loop and the second loop are two capacitive sensors, which are arranged lying opposite one another on the helical mass flow tube, and which record change of distance with respect to time between the first loop and the second loop and forward this to a difference amplifier of a microprocessor.

If the mass flow tube when flowed through by a medium is made to oscillate in such a way that the first loop and the second loop oscillate relative to one another, the mass flow tube is acted upon by a Coriolis force, which, in addition to the oscillation of the two loops relative to one another, excites a torsional oscillation of the first loop and the second loop. Depending on which direction the first loop and the second loop move with respect to one another, due to the Coriolis forces which act upon the mass flow tube, there results a phase shift between the torsional oscillation of the first loop and the torsional oscillation of the second loop, which is recorded by the two sensors and forwarded to the microprocessor for processing, in order to determine from this phase shift a mass flow. Typically, for ascertaining mass flow value by the microprocessor, the oscillation exciter is tuned to a resonance frequency of the mass flow tube, in order to excite oscillations in the first loop and the second loop with as little energy loss as possible.

A disadvantage of such an arrangement is that, in addition to the oscillation excited by the oscillation exciter and the torsional oscillation of the two loops resulting therefrom, other oscillation modes of a higher order are excited, which can lead to an instability of the mass flow tube and, respectively, of its oscillation and/or torsional oscillation, and, thereby, to corruption of the mass flow value.

SUMMARY OF THE INVENTION

An object of the invention is to provide a measuring transducer of vibration type which delivers a precise mass flow value.

Proceeding from the initially described measuring transducer, this object is achieved according to the invention by providing the mass flow tube between the oscillation exciter and the securement element with at least one add-on part acting as a canceling mass.

The provision of such add-on parts has the advantage that, especially in the case of non-planparallel loops of the mass flow tube (as in the case of a helical form), undesired oscillations and/or torsional oscillations can be canceled by the mass of the add-on part exactly at the position at which they arise. In this way, undesired oscillation modes and/or torsional oscillation modes are suppressed before they propagate and couple into the pipe system in which the measuring transducer is installed. According to the invention, it is especially the case that, with the construction discussed, undesired torsional moments can be suppressed, which act around a rotation axis imaginarily connecting the securement element and the oscillation exciter.

In a preferred further development of the invention, an oscillation sensor is provided between the oscillation exciter and the securement element, wherein the add-on part is arranged between the oscillation exciter and the oscillation sensor.

According to a preferred embodiment of the invention, it is additionally provided that the add-on part is secured to exactly one of the two loops. Additionally, it is preferably provided that the mass flow tube has a first add-on part and a second add-on part. In such case, the first add-on part is preferably arranged on the first loop, and the second add-on part on the second loop. This has the advantage that the first loop and the second loop are uniformly loaded.

Preferably, the first add-on part is arranged at a position lying opposite the second add-on part relative to the center of mass of the helical mass flow tube. It is especially preferable in this connection that these two positions are point-symmetrical with regard to the center of mass of the mass flow tube when it is not flowed through. It results from this, that the center of mass of the helical mass flow tube in the flowed-through state essentially remains at the same position, and the mass flow tube can thus oscillate stably.

Preferably, the mass flow tube and the housing are soldered with one another, in order to produce a seamless connection between the housing and the mass flow tube. Preferably, the mass flow tube additionally has a process connection, which is connected with the mass flow tube by means of a screw thread, is connected with the mass flow tube by means of a spring-biased tubular screw connection and/or is welded to the mass flow tube. The forms of embodiment mentioned are preferred forms of embodiment to produce a connection between the mass flow tube and the process connection.

According to a preferred form of embodiment, it is provided that the outer diameter of the mass flow tube and the inner diameter of the mass flow tube form a ratio of $\leq 10$ and $\geq 1$, preferably $\leq 6$ and $\geq 2$, and especially preferably $\leq 5$ and $\geq 3$. Since the measuring transducer of vibration type of the invention is formed into a helix having a first loop and a second loop, the measuring method based on the Coriolis mass flow meter is sensitive enough to measure a mass flow in a relatively thick-walled mass flow tube. A particular embodiment of a mass flow tube provides that the inner diameter is 2.4 mm and the outer diameter 9.5 mm.

BRIEF DESCRIPTION OF THE DRAWINGS

The invention will now be explained in greater detail on the basis of the appended drawing, the figures of which show as follows:

FIG. 1: is a front view of a measuring transducer of vibration type according to an example of an embodiment of the invention, having a mass flow tube formed into a helix secured in a housing; and FIG. 2: is a side view of the mass flow tube of FIG. 1, without the housing.

DETAILED DISCUSSION IN CONJUNCTION WITH THE DRAWINGS

FIGS. 1 and 2 show a measuring transducer of vibration type 1, with FIG. 1 showing a front view and FIG. 2 a side view without the housing. The measuring transducer 1 of vibration type includes a housing 2 and a mass flow tube 3, which is led from outside of the housing 2 into the housing 2, and, at an oppositely-lying position, from an interior of the housing 2 to the outside. The housing 2 is embodied in a box-shaped manner, with the edges of the housing 2 being rounded.

Inside the housing 2, the mass flow tube 3 is formed into a helix, which includes a first loop 4 and a second loop 5. At a location of the mass flow tube 3 entering into the helical region is arranged a securement element 6, which is connected with a location of the mass flow tube 3 emerging from the helical region. Furthermore, the securement element 6 affixes a peripheral point of the first loop 4 to a neighboring peripheral point of the second loop 5 of the mass flow tube 3. On a side lying opposite the securement element 6 is arranged an oscillation exciter 7, which is able to cause the first loop 4 and the second loop 5 of the mass flow tube 3 to oscillate relative to one another.

On the first loop 4 is arranged a first add-on part 8, and on the second loop 5 is arranged a second add-on part 9, with the first add-on part 8 being arranged at a location lying opposite the second add-on part 9 relative to the center of mass of the helical mass flow tube 3. The two add-on parts 8, 9 are mass elements, which also were already referred to earlier as canceling masses, insofar as they cancel undesired oscillations.

The first add-on part 8 is arranged, beginning from an inlet side of the mass flow tube 3, after the oscillation exciter 7, and the second add-on part 9 is arranged, beginning from an outlet side of the mass flow tube 3, before the oscillation exciter 7. The two add-on parts 8, 9 have, in each case, the same distance from the oscillation exciter 7, or from the securement element 6; however, they are arranged nearer to the oscillation exciter 7 than to the securement element 6.

Furthermore, in an inner region of the helical mass flow tube 3, two sensors 10 are arranged, which measure change of distance between the first loop 4 and the second loop 5 of the mass flow tube 3 as a function of time. The sensors 10 have, in each case, the same distance from the securement element 6, or from the oscillation exciter 7; however, they are arranged nearer to the securement element 6.

On an inlet side of the mass flow tube 3, after the securement element 6, are arranged two inlet-side couplers 11, which couple the first loop 4 and the second loop 5 of the mass flow tube 3 with one another. On an outlet side of the mass flow tube 3, shortly before the securement element 6, are arranged two outlet-side couplers 12, which likewise couple the first loop 4 and the second loop 5 of the mass flow tube with one another. The inlet-side couplers 11 and the outlet-side couplers 12 have the task of strengthening a coupling of the oscillation of the first loop 4 and of the second loop 5 of the mass flow tube, in order to assure a precise and constant phase shift of the torsional oscillations of the first loop 4 and the second loop 5.

Operation of the measuring transducer is as follows: The oscillation exciter 7 excites an oscillation of the first loop 4 and the second loop 5 relative to one another. In the case of a mass flow tube 3 which is flowed through by a medium, there results in addition to the excited oscillation a torsional oscillation of the first loop 4 and a torsional oscillation of the second loop 5, wherein the torsional oscillations of the two loops 4, 5 have a phase shift, which can be measured by means of the sensors 10. From the phase shift, the mass flow can, ultimately, be ascertained in known manner.

The invention claimed is:

1. A measuring transducer of the vibration type, comprising:
    a housing and a mass flow tube, wherein:
    said mass flow tube is formed into a helix including a first loop and a second loop;
    said mass flow tube includes a securement element, which affixes a peripheral point of said first loop relative to a neighboring peripheral point of said second loop;
    said mass flow tube includes an oscillation exciter on a side lying opposite said securement element along said mass flow tube; and
    said mass flow tube includes between said oscillation exciter and said securement element at least one add-on part acting as a canceling mass, said add-on part is secured to exactly one of said first and second loops for suppressing undesired torsional moments, which act around a rotation axis imaginarily connecting the securement element and the oscillation exciter.

2. The measuring transducer as claimed in claim 1, wherein:
    an oscillation sensor is provided between said oscillation exciter and said securement element, and said add-on part is arranged between said oscillation exciter and said oscillation sensor.

3. The measuring transducer as claimed in claim 1, wherein:
    a ratio between outer diameter of said mass flow tube and inner diameter of said mass flow tube lies in range of $\leq 6$ and $\geq 2$.

4. The measuring transducer as claimed in claim 1, wherein:
    said mass flow tube includes a first add-on part and a second add-on part.

5. The measuring transducer as claimed in claim 4, wherein:
    said first add-on part is arranged on said first loop and said second add-on part on said second loop.

6. The measuring transducer as claimed in claim 4, wherein:
    said first add-on part is provided at a location which, relative to the center of mass of said helical mass flow tube, lies opposite the position of said second add-on part.

7. The measuring transducer as claimed in claim 1, wherein:
    said mass flow tube and said housing are soldered to one another.

8. The measuring transducer as claimed in claim 1, wherein:
- a ratio between the outer diameter of said mass flow tube and the inner diameter of said mass flow tube lies in range of $\leq 5$ and $\geq 3$.

9. Measuring transducer as claimed in claim 1, wherein:
- a ratio between outer diameter of said mass flow tube and inner diameter of said mass flow tube lies in range of $\leq 10$ and $\geq 1$.

10. A Coriolis mass flow meter, comprising:
- a measuring transducer of the vibration type, comprising:
- a housing: and
- a mass flow tube, wherein:
- said mass flow tube is formed into a helix including a first loop and a second loop;
- said mass flow tube includes a securement element, which affixes a peripheral point of said first loop relative to a neighboring peripheral point of said second loop;
- said mass flow tube includes an oscillation exciter on a side lying opposite said securement element along said mass flow tube; and
- said mass flow tube includes between said oscillation exciter and said securement element at least one add-on part acting as a canceling mass, said add-on part is secured to exactly one of said first and second loops for suppressing undesired torsional moments, which act around a rotation axis imaginarily connecting the securement element and the oscillation exciter.

* * * * *